Figure 1:
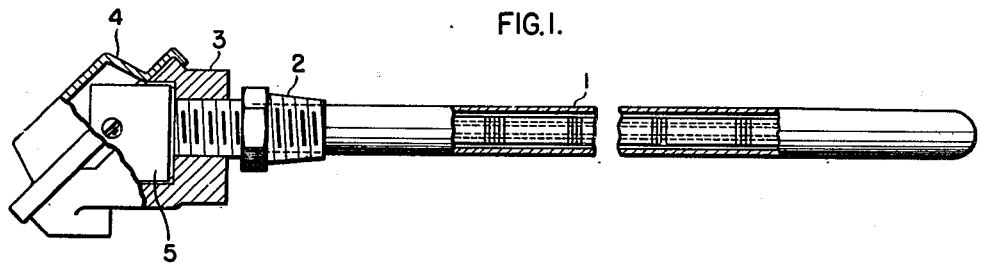

Aug. 7, 1945.                 H. S. JONES                 2,381,058
                              THERMOCOUPLE
                           Filed Dec. 9, 1941

INVENTOR.
HARRY S. JONES
BY C. B. Spangenberg
ATTORNEY

Patented Aug. 7, 1945

2,381,058

UNITED STATES PATENT OFFICE 2,381,058

THERMOCOUPLE

Harry S. Jones, Washington, D. C., assignor to The Brown Instrument Company, Philadelphia, Pa., a corporation of Pennsylvania Application December 9, 1941, Serial No. 422,264

6 Claims. (Cl. 136—4)

The present invention relates to improvements in thermocouples and more particularly to the provision of means for preventing erosion of the thermocouple wires between the porcelain insulators that are commonly used to support and separate these wires.

It is customary in the art to provide porcelain insulators for the wires of a thermocouple to hold these wires apart and to hold them in their proper positions with respect to each other. These insulators can either take the form of beads which are adapted to receive a single wire or they can take the form of beads which are provided with parallel holes each of which is adapted to receive one of the wires of the thermocouple. Generally speaking these porcelain beads are not pressed tightly against each other over the wires since some slack is necessary in order for the thermocouples to be bent or otherwise guided when being placed in a protecting tube or directly into a container whose temperature is to be measured. It has been found that quite often thermocouple failures occur due to breakage of the thermocouple wires between these porcelain insulators or beads. This failure is due to the fact that the wires are worn away or eroded to such an extent that they snap apart. The reason for this wearing away of the wires between the porcelain insulators is due to several things one of which is the fact that high frequency vibrations often occur which vibrations act to chip off small particles of porcelain which have the effect of sand-blasting the wire and thereby breaking it. Another possible reason for failure of the wires is that they are exposed to the atmosphere or other gases at high temperature and these gases corrode the wire between the insulating beads where the wire is exposed to the atmosphere. Even when the thermocouple is in a protecting tube the action of these gases is present since most metals are more or less porous at high temperatures.

It is an object of my invention to provide thin shims or washers between the insulating members which surround the thermocouple wires. These washers serve to protect the thermocouple wires from the effects of the atmosphere and serve to prevent porcelain chips from the insulators from eroding the wire between the insulators.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

Figure 2:
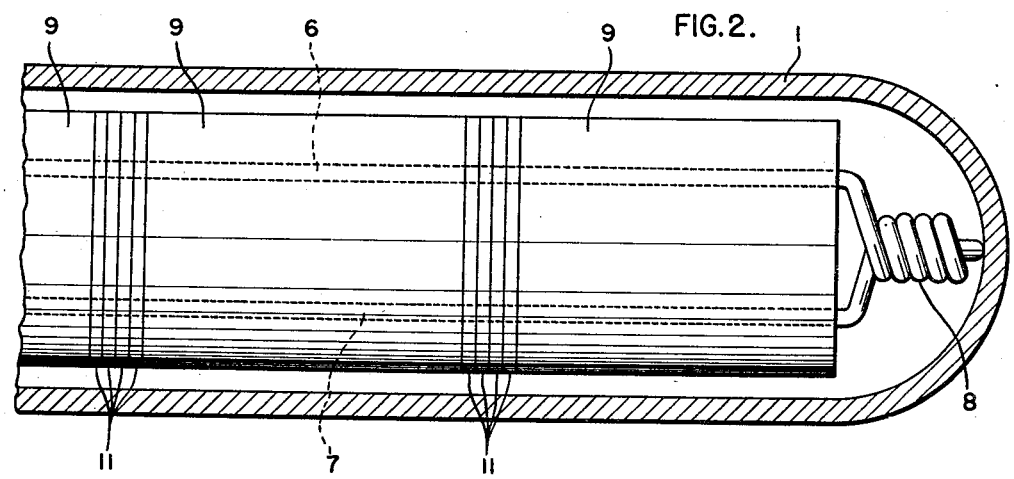
Figure 3:
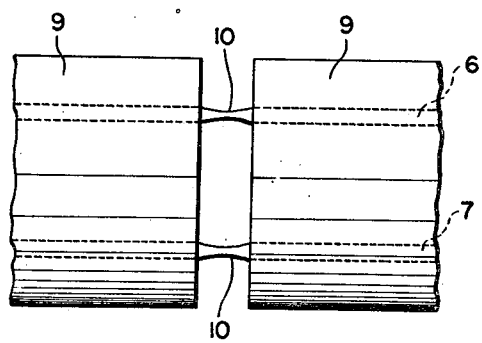

In the drawing:

Fig. 1 is a view, partly in section, of a thermocouple embodying my improvement, the thermocouple being mounted in a protecting tube, Fig. 2 is an enlarged section view of a portion of the thermocouple, and Fig. 3 is a view showing the manner in which the wires of the thermocouple are eroded without the use of the washers of my invention.

Referring first to Fig. 1 there is shown a protecting tube 1 for a thermocouple, which tube is provided with a threaded collar 2 that serves to attach the protecting tube to a wall through which the thermocouple is to extend. Attached to the end of the protecting tube is a head 3 provided with a removable cover 4 which serves to protect a terminal block 5 for the thermocouple. Fastened in this terminal block are the ends of the thermocouple wires 6 and 7, which at their other ends are joined to form a hot-junction 8. The wires 6 and 7 of the thermocouple between the terminal 5 and the hot-junction 8 are separated from each other and from the protecting tube by means of porcelain insulators 9. The insulators each have a pair of holes through which the wires extend.

Because of the fact that the wires at times have to be bent and should have some flexibility, it is not customary to force the insulating members 9 tightly against each other. This permits a flexibility of the thermocouple which is desirable and necessary. Another reason for not forcing the insulators 9 tightly against each other is that they are usually made of some ceramic such as porcelain and if they abut each other they will chip and crack at the ends. Due to the fact that the insulators do not closely abut each other there are portions of each of the thermocouple wires that are not protected by the insulators. This unprotected portion of the wire is often eaten away as shown at 10 in Fig. 3 either by corrosive gases in which the thermocouple is immersed or by the small particles of porcelain which are chipped off of the insulating blocks 9 and which serve to act on the exposed portion of the wires in a manner similar to sand-blasting to thereby wear these wires away. This sand-blasting effect is probably produced by high frequency vibrations which are set up in the thermocouple elements as a result of vibrations of the supporting members and furnaces, etc. in which the thermocouple is used. In any event, a large percentage of thermocouple failures occur due to the erosion of the wires as shown at 10.

In order to overcome this type of failure in thermocouples I have inserted in between each of the insulating members 9 a series of washers 11 which washers serve to prevent exposure of the thermocouple wire between the insulating members. These washers should be made of some material which will withstand the temperature to which the thermocouple is to be subjected and which will not have any chemical effect on the thermocouple wires. I have found that mica or felted asbestos serves admirably for this purpose. When the thermocouple is to be rigidly mounted and there will be little or no bending of the same the washers 11 may well be made of mica. This substance is an excellent insulator and when made in washer form will effectively cover the normally exposed portions of thermocouple wire. Felted asbestos, is generally somewhat softer than mica and is, therefore, more to be preferred for the washers if the thermocouple wires will have to be bent. Washers of the latter type are slightly compressible and will give as the wires are bent. In either case the washers will completely protect the wires and will give enough to allow for normal movement of the wires and insulators relative to each other.

It will be seen that I have provided a means for protecting a thermocouple wire in between the porcelain insulators that are placed over the same and have, therefore, provided an effective means to prevent thermocouple failure due to the erosion or eating away of the wires between these insulators.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases cerain features of this invention may sometimes be used to advantage without a corresponding use of other features.

Having now described this invention, what I claim as new and desire to secure by Letters Patent is:

1. The combination with a thermocouple consisting of a pair of wires, a series of insulating members surrounding and separating said wires and a plurality of resilient, non-conducting, heat-resisting washers filling the space along each wire between the insulators.

2. In combination with a thermocouple comprising a pair of wires joined at one end, insulating members of a ceramic material mounted on said wires and being separated from each other, and washers of a resilient non-conducting and heat-resistant material mounted on said wires between the insulating members to fill up the space between said members whereby none of the wire between said members will be exposed.

3. In combination with a temperature measuring element comprising a plurality of wires joined at one end, a plurality of pieces of rigid insulating material surrounding said wires with a space between each of said pieces, and washers of a resilient, heat resisting, and non-conducting material surrounding said wires between said pieces of insulating material whereby none of the wire is exposed.

4. In combination with a thermocouple having a pair of wires joined at one end, rigid ceramic insulators mounted on said wires to insulate and separate them from each other, and a plurality of mica washers between each insulator, to separate the same and to cover the portions of the wires that would otherwise be exposed between said insulators.

5. In combination with a thermocouple comprising a pair of wires joined at one end, a plurality of ceramic insulators surrounding said wires, and asbestos washers surrounding said wires between each insulator whereby each wire is completely covered.

6. The combination with a temperature measuring element comprising a plurality of wires joined together at one end, of a plurality of rigid insulating members subject to chipping surrounding said wires, and a plurality of resilient, non-conducting and heat resisting washers surrounding said wires in between each of said insulating members whereby said members cannot engage each other.

HARRY S. JONES.